(12) United States Patent
Schweid et al.

(10) Patent No.: US 8,879,118 B2
(45) Date of Patent: Nov. 4, 2014

(54) METHOD TO ALIGN AND APPLY GEOMETRIC DISTORTION AND UNIFORMITY COMPENSATION DATA

(75) Inventors: Stuart A. Schweid, Pittsford, NY (US); Joseph C. Sheflin, Macedon, NY (US); Beilei Xu, Penfield, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 845 days.

(21) Appl. No.: 13/012,011

(22) Filed: Jan. 24, 2011

(65) Prior Publication Data

US 2012/0188565 A1 Jul. 26, 2012

(51) Int. Cl.
*H04N 1/60* (2006.01)
*H04N 1/46* (2006.01)
*G03F 3/08* (2006.01)
*G06K 9/00* (2006.01)
*H04N 1/401* (2006.01)
*H04N 1/387* (2006.01)

(52) U.S. Cl.
CPC ............. *H04N 1/401* (2013.01); *H04N 1/6027* (2013.01); *H04N 1/387* (2013.01)
USPC ............ 358/1.9; 358/504; 358/518; 382/162; 382/167

(58) Field of Classification Search
USPC .................... 358/1.9, 518, 504; 382/162, 167
See application file for complete search history.

(56) References Cited

U.S. PATENT DOCUMENTS

2005/0099446 A1* 5/2005 Mizes et al. ..................... 347/19
2006/0077488 A1 4/2006 Zhang et al.
2010/0309526 A1* 12/2010 Kulkarni et al. ............. 358/3.26

* cited by examiner

*Primary Examiner* — Charlotte M Baker
(74) *Attorney, Agent, or Firm* — Fay Sharpe LLP

(57) ABSTRACT

As set forth herein, computer-implemented methods and systems facilitate detecting non-uniformities (e.g., streaks or other defects) in a scanned image, and correcting the non-uniformities while accounting for geometric distortion therein. For instance a scanned image may include a light streak (e.g., higher L* values than expected) down the page at a given distance from a page edge. Paper shrinkage may also cause the image to be magnified relative to the page. Correction values (e.g., L* knockdown values or the like) are generated to bring the non-uniform L* values down to a darker level. To account for the magnification of the image, the correction values are electronically registered to uniformity data for the page, and applied at the correct location to account for the magnification. The corrected image is then printed by a marking device.

20 Claims, 4 Drawing Sheets

METHOD TO ALIGN AND APPLY GEOMETRIC DISTORTION AND UNIFORMITY COMPENSATION DATA

TECHNICAL FIELD

The present exemplary embodiments broadly relate to printing devices. They find particular application with printed image quality improvement and streak reduction. However, it is to be appreciated that the present exemplary embodiments are also amenable to other like applications.

BACKGROUND

Often, a marking engine may include a streak reduction or correction component (e.g., the Auto Density Control from Xerox or the like) to reduce streaks in prints. For systems that employ electronic registration, such as Side1/Side2 (S1/S2) magnification adjustment, the appearance of narrow streaks can actually be more pronounced when special steps are not taken to align compensation data. This can occur when one magnification factor is used when uniformity data is acquired and a different factor is used when the uniformity compensation is applied.

The streak reduction component may employ a form of spatially varying tone reproduction curve (TRC) that is used to compensate for streaking in a marking engine. Electronic registration can be used to scale an image to compensate for magnification effects and is used to scale a digital image to compensate for paper shrinkage in S1/S2 printing. One way that such electronic registration techniques are used is to apply an inverse paper shrinkage scaling to Side 1 of a print. That is, if the paper will shrink by a factor 0.998, a digital magnification of 1.002 will be applied to Side 1. After printing and fusing, Side 1 will be at nominal size. Assuming paper shrinkage is minimal for a second fusing, Side 2 can be printed at the nominal size to get S1 and S2 to be matched in size.

Using electronic registration with streak reduction presents a compensation alignment problem. For instance, streak reduction algorithms may be more practical at 600 spi, while the electronic registration algorithms achieve optimal image quality using a Vertical Cavity Surface Emitting Laser (VCSEL) Raster Output Scanner (ROS) with an output of 2400 spi.

If the non-uniformity calibration data is acquired with one electronic registration magnification factor (e.g., 1.0) but applied at another, the streak reduction compensation will be misaligned with marking process. More specifically, by way of example, the streak reduction component may be calibrated with an electronic registration magnification of 1.0, which is the current practice due to on-belt measurement of non-uniformity. When S1 is passed through the streak reduction component, the compensation is applied on a pixel-column-by-pixel-column basis assuming the compensation for a given column will be registered with the corresponding physical column in the marking process. If the image is then scaled up by 1.002 in the electronic registration software to compensate for subsequent paper shrinkage, the uniformity compensation applied to each pixel column will not be in register with the corresponding physical columns in the marking process.

Other printing and compensation scenarios can cause the same type of streak defect. For instance, even if spatial scale factors for Side 1 and Side 2 for a given paper are employed, changing the paper type without shrinkage recalibration could cause the streak defect unless new paper scaling parameters were provided for correction. There may be similar issues in print bar (LED or ink jet) uniformity compensation via TRCs in the presence of thermal expansion.

There is an unmet need in the art for convenient and easy-to-use systems and methods that facilitate aligning compensation data with non-uniformities in a scanned image to ensure that the compensation data is applied at the correct position on the scanned page.

BRIEF DESCRIPTION

In one aspect, a computer-implemented method for compensating for non-uniformities in a printed image comprises acquiring uniformity data for a scanned page, the uniformity data including information describing an amount of geometric distortion to which at least one side of the scanned page has been subjected, and spatially scaling one or more tone reproduction curves (TRC) used to generate uniformity compensation data by a predetermined factor as a function of one or more geometric distortion parameters. The method further comprises generating, as a function of the spatially scaled TRCs, uniformity compensation data that compensates for non-uniformities on the at least one side of the scanned page, wherein the uniformity compensation data is in register with a non-uniformity in the at least one side of the scanned page. Additionally, the method comprises applying the registered scaled uniformity compensation data to the uniformity data to compensate for the non-uniformity in, and printing the compensated page.

In another aspect, a system that compensates for non-uniformities in a printed image comprises a marking device that prints compensated images, and a processor that executes computer-executable instructions for compensating non-uniformities in scanned images. The instructions comprise acquiring uniformity data for a scanned page, the uniformity data including information describing an amount of geometric distortion to which at least one side of the scanned page has been subjected, and spatially scaling one or more tone reproduction curves (TRC) used to generate uniformity compensation data by a predetermined factor as a function of one or more geometric distortion parameters. The instructions further comprise generating, as a function of the scaled TRCs, spatially scaled uniformity compensation data that compensates for non-uniformities on the at least one side of the scanned page, wherein the spatially scaled uniformity compensation data is registered to a non-uniformity in the at least one side of the scanned page. The instructions further comprise applying the registered scaled uniformity compensation data to the uniformity data to compensate for the non-uniformity, and outputting the compensated page to the marking device for printing.

In yet another aspect, a system that compensates for non-uniformities in a printed image comprises a marking device that prints compensated images, and a compensation module that comprises a plurality of modules that are executed by a processor and that facilitate compensating for geometric distortion in a scanned image. The plurality of modules comprises a scaling module that scales one or more tone reproduction curves according to one or more geometric distortion parameters and outputs scaled TRCs, and a correction module that applies the scaled TRCs to uniformity data for the scanned image and generates a uniformity compensated image. The modules further include an electronic registration module that receives the uniformity compensated image and aligns uniformity compensation data to account for geometric distortion in order to register the uniformity compensation data to the scanned image, and outputs the registered and compensated image to the marking device for printing.

DETAILED DESCRIPTION

In the following description, various examples are described wherein the electronic registration component, referred to as "Chiper," comprises software and associated hardware including a processor or the like, and the streak reduction component is an Auto Density Control component (e.g., software, hardware such as a processor and/or memory, a combination thereof, etc.). However, it will be appreciated that other streak reduction methods and systems, and other electronic registration systems and methods may be employed in conjunction with the herein-described systems and methods.

One solution to the above-described problem is to collect the Auto Density Control or uniformity correction calibration data with the intended S1 or S2 scaling applied. This approach circumvents the aforementioned problem directly. However, the magnification scaling is not static; it is a function of side printed (i.e. Side 1 or Side 2), paper type, paper size, paper age, humidity, fuser pressure, etc. For instance, humidity information may include a humidity level for an environment in which the image is being corrected and printed, since humidity level can cause the paper to swell or shrink. The pressure of the fuser, which is used to "fix" the toner to the paper, may be non uniform, leading a nonuniform shrinking or expansion. Therefore at least two sets of Auto Density Control correction data (Side 1 and Side 2) would be collected for every job, as well as corrections for multiple paper types. The number of permutations may require a large set of Auto Density Control data corrected to handle any possible side/paper/humidity combination of a given print job. Additionally, even if all parameters sets are stored a priori, they would have to be dynamically sent to the Auto Density Control correction block in real time. The Auto Density Control correction data may be a large data set and so may adversely real-time bandwidth and CPU interaction.

Figure 1:
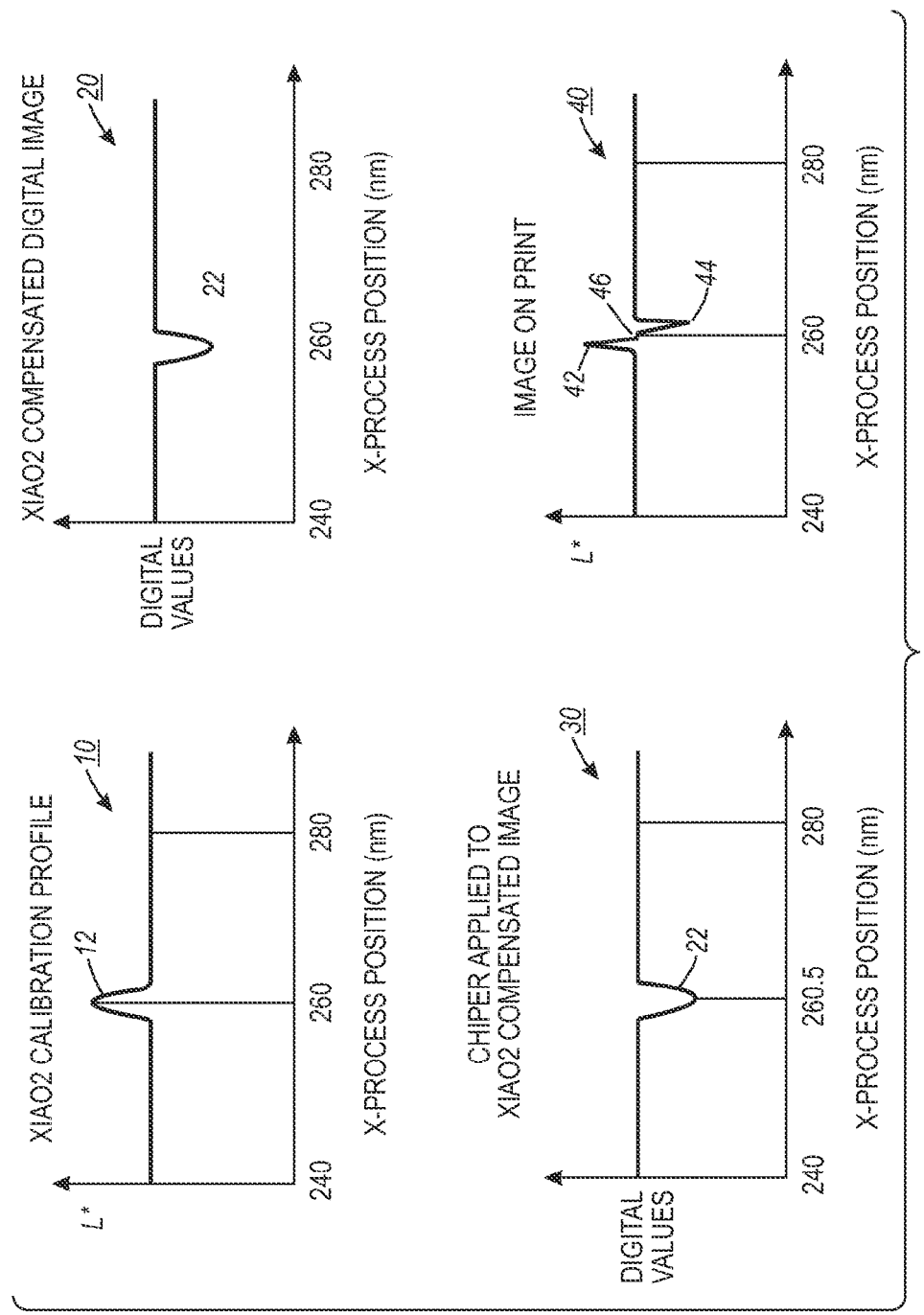
FIG. 1 illustrates a plurality of graphs that collectively show the problem solved by the here-described systems and methods.

FIG. 1 illustrates a plurality of graphs that collectively show the problem solved by the here-described systems and methods. The graphs exemplify a lack of compensation and potential enhancement of a streak due to independent compensation for streaks and 0.2% paper shrinkage, such as can occur using a streak reduction component such as the Auto Density Control with electronic software such as Chiper, from Xerox. A 1 mm wide streak is shown at 250 mm from the start of a scan.

A graph 10 shows increased L* values 12 near 250 mm from the leading edge of the page, which correspond to a light streak running down a column of pixels on a printed page, for example. The graph 20 shows reduced digital values 22 near 250 mm from the leading edge of the page. The reduced values correspond to are applied by the Auto Density Control to compensate for the increased L* values in the graph 10, in order to prevent the printed image from exhibiting a streak. The graph 30 shows the reduced digital values 22, which are offset due to magnification. That is, if the image has been magnified (i.e. geometrically distorted), then the streak reduction knockdown values will be slightly misaligned and the streak reduction is not as effective as desired.

Graph 40 shows the effect of the misaligned knockdown values on a printed image. For instance, since the image in this example has been magnified 1.002 times, the knockdown values are applied 0.2% too far to the right (e.g., centered at 250.5 mm rather than centered on 250 mm). Thus, the left-most increased L* values are not compensated, as shown by the peak 42, while L* values to the right of the streak are compensated, causing the trough 44. A corrected region 46 is shown between the peak 42 and the trough 44, and represents pixels that have been corrected by application of the knockdown values despite the misalignment of the correction. Therefore, according to various aspects described herein, systems and methods are described that facilitate aligning the correction values applied during streak reduction to account for image magnification. In the example of FIG. 1, this alignment comprises re-centering the knockdown values 22 (the trough centered at 250 mm in the graph 20) to 250.5 mm to account for the 0.2% magnification.

Figure 2:
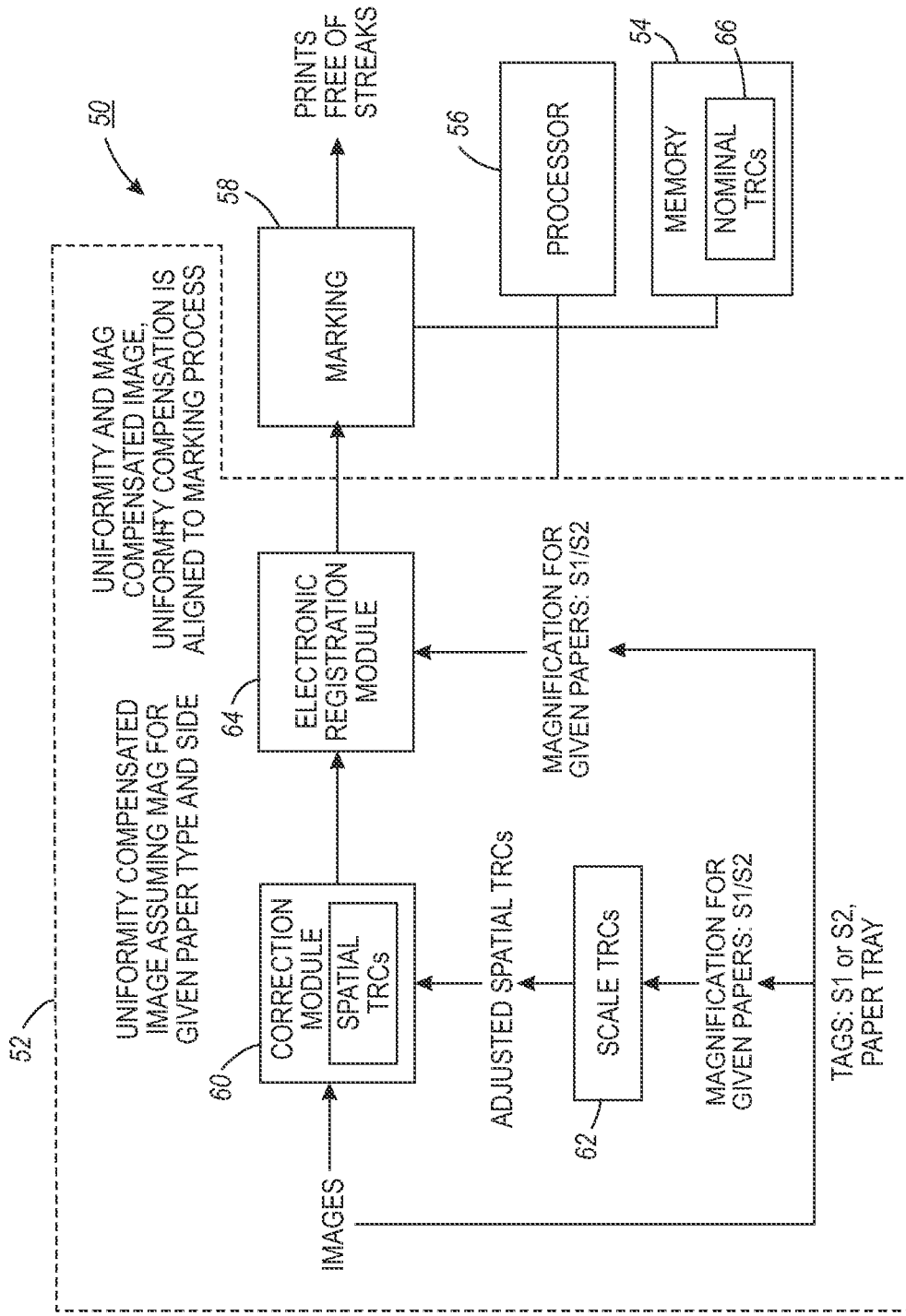
FIG. 2 illustrates a system that facilitates aligning geometric distortion data (e.g., magnification data) with uniformity compensation data for the purpose of performing both types of compensation.

FIG. 2 illustrates a system 50 that facilitates aligning geometric distortion data (e.g., magnification data) with uniformity compensation data for the purpose of performing both types of compensation. The system 50 includes an image compensation module 52 that is coupled to a memory 54 and a processor 56, which are further coupled to a marking device 58 (e.g., a printer or the like). It will be appreciated that, although depicted as a separate component, the compensation module 52 may be stored integrally in the memory 54 and executed by the processor 56. In another example, the memory 54 and compensation module 52 are integral to the processor 56 and form an integrated product. It will be appreciated that the memory thus stores, and the processor executes, computer-executable instructions for performing the various functions, methods, techniques, etc., described herein. Moreover, "module," as used herein, denotes a computer-executable set of instructions, program, routine, algorithm, etc., stored on a computer-readable medium such as the memory 54.

The compensation module 52 comprises a correction module 60 that includes spatial TRCs 61 that are applied to scanned input images to compensate non-uniform data (e.g., high L* values such as are shown in the graph 10 of FIG. 1). The spatial TRCs may be Auto Density Control spatial TRCs, according to one example, but are not limited thereto. As the input images or pages are scanned, metadata tags are analyzed to glean information about the pages being scanned, including which page side information (e.g., Side 1 or Side 2), paper type information, etc. The metadata also includes magnification information (e.g., an amount of magnification applied to each side) for the scanned pages. The magnification could be a single value that globally applies to a page, or it could be have a spatial dependence due to non-uniform shrinkage or expansion. The magnification information for both sides of the scanned pages is received by a scaling module 62 that spatially scales one or more TRCs as a function of magnification applied to Side 1 and/or Side 2 of the input pages, and outputs adjusted spatial TRCs to the correction module 60 for application to the pages in digital electronic form.

The magnification information gleaned from the input images also is provided to an electronic registration module 64, such as a Chiper module or the like (or any other suitable electronic registration module) that adjusts the alignment of the uniformity compensation data (e.g., knockdown values 22 shown in graph 20 of FIG. 1) so that the uniformity compensation data is applied at the correct location. That is, the electronic registration module 64 performs a magnification compensation adjustment to align correction values generated by the correction module 60 to the streak that requires correction. Additionally, the electronic registration module 64 receives from the correction module 60, uniformity-compensated image data that assumes a given amount of magnification for a given paper types and sheet side. The electronic registration module 64 outputs to the marking device 58 uniformity and magnification-compensated image data that is aligned to the marking process, since the TRCs have been spatially scaled in location by the scaling module 62 prior to application of the TRCs thereby accounting for magnification during uniformity compensation as well as during magnification compensation. That is, magnification compensation information is input to the scaling module 62, which spatially scales the spatial TRCs. The marking device then prints and outputs the compensated images. In this manner, the uniformity correction or compensation data is scaled by the inverse of a magnification correction applied by the correction The spatial scaling may be done off line as a function of paper side and type, and scaled TRCs are then selected based on information contained in a metadata tag that indicates paper side and type. According to another aspect, a nominal set of spatial TRCs 66 can be stored in the memory 54 and scaled at time of use according to paper type and size.

In this manner, the system 50, via the processor 56, applies current distortion data (e.g., Side 1 or Side 2 paper shrinkage or the like) to uniformity compensation data so that the two types of compensation data are in register. In one example, Auto Density Control uniformity data is magnified in the fast scan direction by a factor equal to the factor used in the electronic registration module to compensate for the given side in S1/S2 magnification compensation. The Auto Density Control magnification compensation is switched as S1 and S2 are printed and is varied accordingly with paper type and other shrinkage conditions. In Auto Density Control this is accomplished by magnification of weights (e.g., spatial scaling of weights) in the Auto Density Control correction. In general, if an image is transformed using the following equation:

$$I._{mag}(x,y)=I(f(x),y) \quad (1)$$

where I(x, y) is the digital image, and f(x) is a warping (e.g. magnification) in the cross-process direction then the weights of Auto Density Control are similarly transformed such that:

$$w._{mag}(x,y)=w(f(x),y). \quad (2)$$

This approach can be extended to other systems where a non-static cross-process warping is applied between the uniformity (aligned with the marker) correction stage and the scaling process. In such an application, the uniformity correction stage can be represented as a function of the cross-process position so that the warping equivalent of Eq. (2) can be applied. Additionally the herein-described methods, techniques, algorithms, systems, etc., are not limited to linear transformations (e.g. magnification) in the cross-process direction, but rather apply to any generalized function.

According to an example, an image on a page that has been subjected to 0.5% shrinkage may be magnified by approximately 0.5%. Thus, pixel 1000 in a given row of pixels may be positioned at location 1005. Therefore, uniformity correction data (e.g., a knockdown value or the like) that is generated for pixel location 1005 by the system of FIG. 2 is applied to pixel 1000. In this manner, uniformity correction data is aligned to compensate the correct pixels.

Figure 3:
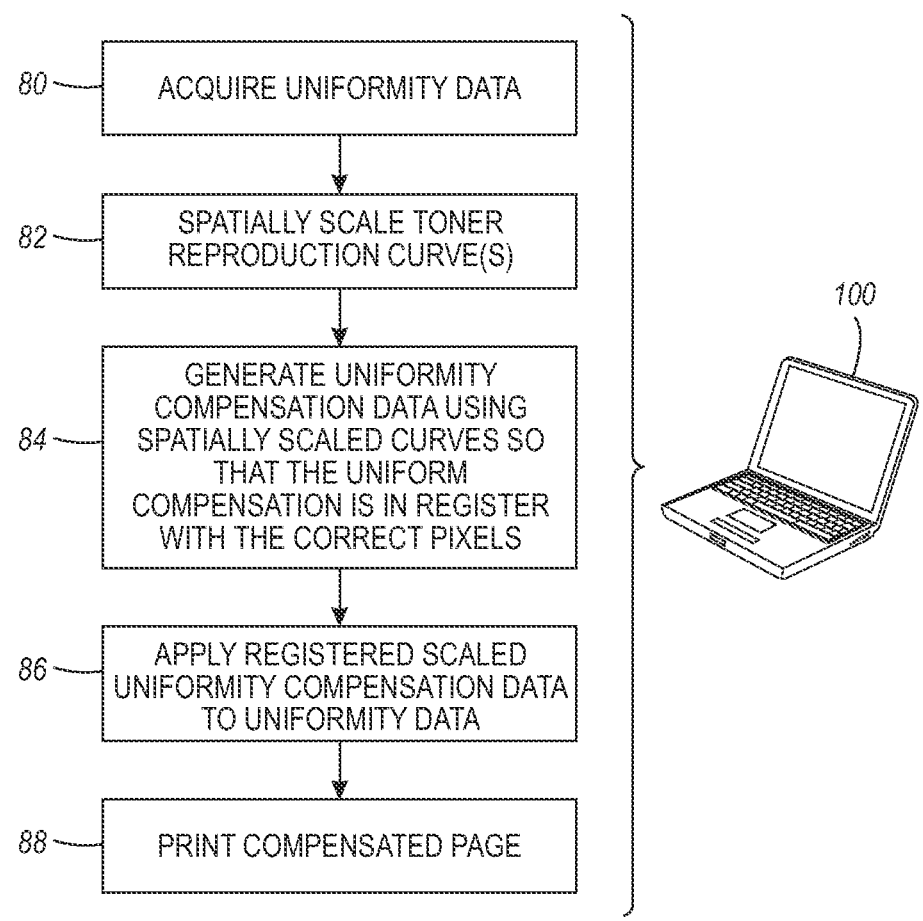
FIG. 3 illustrates a method for aligning and applying geometric distortion correction and uniformity compensation data.

FIG. 3 illustrates a method for aligning and applying geometric distortion correction and uniformity compensation data. At 80, uniformity data is acquired for a scanned page, the uniformity data including information describing an amount of geometric distortion to which at least one side of the scanned page has been subjected. At 82, one or more toner reproduction curves (TRC) is or one or more parameters thereof is spatially scaled. The TRCs are used to generate uniformity compensation data that is offset by a predetermined factor as a function of one or more geometric distortion parameters. At 84, spatially scaled uniformity compensation data is generated as a function of the spatially scaled TRCs so that the uniform compensation data is in register with the correct pixels (i.e., the pixels that require compensation). The uniformity compensation data compensates for non-uniformities on the at least one side of the scanned page. At 86, the registered scaled uniformity compensation data is applied to the uniformity data to compensate for a non-uniformity in the at least one side of the scanned page. At 88, the compensated page is printed.

According to one aspect, the geometric distortion parameters comprise information describing an amount of digital magnification due to one or more of paper shrinkage, paper age, paper size, paper type information, and/or humidity information. According to another aspect, the geometric distortion parameters comprise information that indicates whether the uniformity data corresponds to a first side or a second side of the scanned page.

Figure 4:
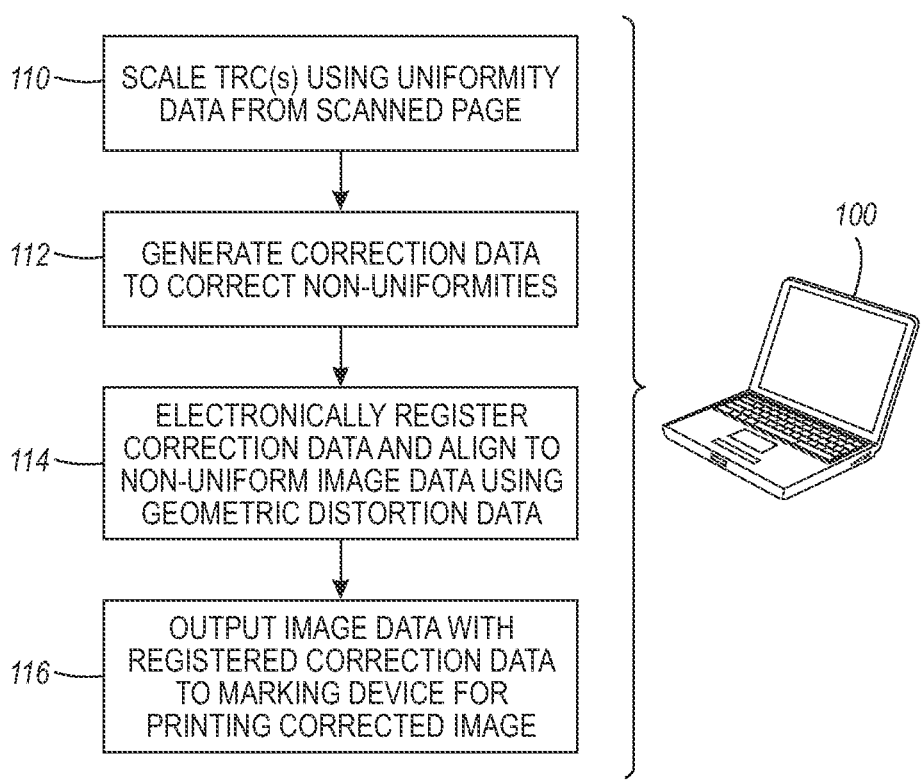
FIG. 4 illustrates a method for compensating for non-uniformities in a printed image.

FIG. 4 illustrates a method for compensating for non-uniformities in a printed image. At 110, uniformity data regarding the scanned page and comprising geometric distortion information is used to spatially scale one or more TRCs. The scaled TRCs are used to generate correction data (e.g., L* value adjustments or the like) to correct non-uniformities in the scanned image, at 112. At 114, the geometric distortion information is used to electronically register the correction data to the corresponding image data, so that the correction data is aligned to the image data despite the geometric distortion of the image data. At 116, the registered correction data and image data are output to a marking device that prints the image using the correction data to mitigate non-uniformities in the printed image. According to one aspect, the electronic registration is performed using a Chiper-type electronic registration module. In another aspect, the correction data is generated using a Auto Density Control type correction module.

It will be appreciated that the methods of FIGS. 3 and 4 can be implemented by a computer 100, which comprises a processor (such as the processor 56 of FIG. 1) that executes, and a memory (such as the memory 54 of FIG. 1) that stores, computer-executable instructions for providing the various functions, etc., described herein.

The computer 100 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 100 can include the processing unit 56 (FIG. 1), a system memory 54 (FIG. 1), and a system bus (not shown) that couples various system components including the system memory to the processing unit. The processing unit can be any of various commercially available processors. Dual microprocessors and other multi-processor architectures also can be used as the processing unit.

The computer 100 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through an input device (not shown) such as a keyboard, a pointing device, such as a mouse, stylus, voice input, or graphical tablet. The computer 100 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for compensating for non-uniformities in a printed image comprising:
    acquiring uniformity data for a scanned page, the uniformity data including information describing an amount of geometric distortion to which at least one side of the scanned page has been subjected;
    spatially scaling one or more tone reproduction curves (TRC) used to generate uniformity compensation data by a predetermined factor as a function of one or more geometric distortion parameters;
    generating, as a function of the spatially scaled TRCs, uniformity compensation data that compensates for non-uniformities on the at least one side of the scanned page, wherein the uniformity compensation data is in register with a non-uniformity in the at least one side of the scanned page;
    applying the registered scaled uniformity compensation data to the uniformity data to compensate for the non-uniformity; and
    printing the compensated page.

2. The method according to claim 1, wherein the electronic registration is performed using a Chiper type electronic registration module.

3. The method according to claim 1, wherein the uniformity compensation data is generated using an Auto Density Control type uniformity correction module.

4. The method according to claim 1, wherein the geometric distortion parameters comprise information describing an amount of digital magnification due to one or more of paper shrinkage, paper age, and paper size.

5. The method according to claim 1, wherein the geometric distortion parameters comprise paper type information and humidity information.

6. The method according to claim 1, wherein the geometric distortion parameters comprise information that indicates whether the uniformity data corresponds to a first side or a second side of the scanned page.

7. A processor configured to execute computer-executable instructions for performing the method of claim 1, the instructions being stored on a non-transitory computer-readable medium.

8. A system that compensates for non-uniformities in a printed image comprising:
    a marking device that prints compensated images;
    a processor that executes computer-executable instructions for compensating non-uniformities in scanned images, the instructions comprising:
        acquiring uniformity data for a scanned page, the uniformity data including information describing an amount of geometric distortion to which at least one side of the scanned page has been subjected;
        spatially scaling one or more tone reproduction curves (TRC) used to generate uniformity compensation data by a predetermined factor as a function of one or more geometric distortion parameters;
        generating, as a function of the scaled TRCs, spatially scaled uniformity compensation data that compensates for non-uniformities on the at least one side of the scanned page, wherein the spatially scaled uniformity compensation data is registered to a non-uniformity in the at least one side of the scanned page;
        applying the registered scaled uniformity compensation data to the uniformity data to compensate for the non-uniformity; and
        outputting the compensated page to the marking device for printing.

9. The system according to claim 8, further comprising a Chiper type electronic registration module that performs the electronic registration.

10. The system according to claim 8, further comprising an Auto Density Control type uniformity correction module that generates the uniformity compensation data.

11. The system according to claim 8, wherein the geometric distortion parameters comprise information describing an amount of digital magnification due to one or more of paper shrinkage, paper age, and paper size.

12. The system according to claim 8, wherein the geometric distortion parameters comprise paper type information and humidity information.

13. The system according to claim 8, wherein the geometric distortion parameters comprise information that indicates whether the uniformity data corresponds to a first side or a second side of the scanned page.

14. A system that compensates for non-uniformities in a printed image, comprising:
 a marking device that prints compensated images; and
 a compensation module that comprises a plurality of modules that are executed by a processor and that facilitate compensating for geometric distortion in a scanned image, the plurality of modules comprising:
  a scaling module that scales one or more tone reproduction curves according to one or more geometric distortion parameters and outputs scaled TRCs;
  a correction module that applies the scaled TRCs to uniformity data for the scanned image and generates a uniformity compensated image;
  an electronic registration module that receives the uniformity compensated image and aligns uniformity compensation data to account for geometric distortion in order to register the uniformity compensation data to the scanned image, and outputs the registered and compensated image to the marking device for printing.

15. The system according to claim 14, wherein the electronic registration module is a Chiper type electronic registration module.

16. The system according to claim 14, wherein the correction module is an Auto Density Control type uniformity correction module.

17. The system according to claim 14, wherein the geometric distortion parameters comprise information describing an amount of digital magnification due one or more of paper shrinkage, paper age, and paper size.

18. The system according to claim 14, wherein the geometric distortion parameters comprise paper type information and humidity information.

19. The system according to claim 14, wherein the geometric distortion parameters comprise information that indicates whether the uniformity data corresponds to a first side or a second side of the scanned page.

20. The system of claim 14, wherein the uniformity compensation data includes adjusted L* values that are applied to non-uniform pixel values in the scanned image to compensate the non-uniform pixels and correct the scanned image.

\* \* \* \* \*